US012679406B2

(12) United States Patent (10) Patent No.: US 12,679,406 B2
Dolgov et al. (45) Date of Patent: Jul. 14, 2026

(54) COMPUTER-IMPLEMENTED METHOD AND SYSTEM FOR PLANNING THE BEHAVIOR OF A PARTICIPANT IN A TRAFFIC SCENE

(71) Applicant: Robert Bosch GmbH, Stuttgart (DE)

(72) Inventors: Maxim Dolgov, Renningen (DE); Faris Janjos, Stuttgart (DE); Yinzhe Shen, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 246 days.

(21) Appl. No.: 18/676,215

(22) Filed: May 28, 2024

(65) Prior Publication Data

US 2024/0400093 A1    Dec. 5, 2024

(30) Foreign Application Priority Data

May 31, 2023    (DE) .................... 10 2023 205 056.0

(51) Int. Cl.
*B60W 60/00* (2020.01)
*G06T 7/11* (2017.01)
*G08G 1/01* (2006.01)

(52) U.S. Cl.
CPC ............. *B60W 60/001* (2020.02); *G06T 7/11* (2017.01); *G08G 1/0112* (2013.01); *G08G 1/012* (2013.01);
(Continued)

(58) Field of Classification Search
None
See application file for complete search history.

(56) References Cited

U.S. PATENT DOCUMENTS

2022/0274601 A1*  9/2022  Jia ........................ B60W 40/072
2022/0301097 A1   9/2022  Rhodes et al.
(Continued)

FOREIGN PATENT DOCUMENTS

DE    10 2021 203 440 A1    10/2022

OTHER PUBLICATIONS

Li et al., "VoxFormer: Sparse Voxel Transformer for Camera-based 3D Semantic Scene Completion", Mar. 25, 2023, arXiv:2302. 12251v2 (13 Pages).
(Continued)

*Primary Examiner* — Joseph R Haley

(74) *Attorney, Agent, or Firm* — Maginot, Moore & Beck LLP

(57) ABSTRACT

A computer-implemented method is for behavior planning of a participant in a traffic scene. The method includes generating a grid-based scene representation based on aggregated scene-specific information and dividing the grid-based scene representation into multiple tiles each representing a partial area of the traffic scene. The method further includes distributing the scene-specific information over at least two semantic levels of the scene representation. The distribution is retained during the division into tiles in order to form at least one type of sub-tile based on the tiles and the semantic levels. The method further includes mapping the grid-based scene representation to latent features based on the tiles or sub-tiles. The semantic relationships between the tiles or sub-tiles of at least one type are taken into account. The latent features thus generated are used as input for at least one downstream deep learning module for predicting a development of the traffic scene.

12 Claims, 3 Drawing Sheets

(52) U.S. Cl.
CPC ......... *G08G 1/0133* (2013.01); *G08G 1/0141*
(2013.01)

(56) References Cited

U.S. PATENT DOCUMENTS

2023/0334876 A1 * 10/2023 Chen .................... G06V 10/764
2025/0128731 A1 *  4/2025 Chang ................ B60W 60/001
2025/0346249 A1 * 11/2025 Borse ................... G06V 10/764

OTHER PUBLICATIONS

"Vision Transformers", Wikipedia, https://en.wikipedia.org/w/index.
php? title=Vision_transformer&oldid=1146877500, Mar. 27, 2023,
Accessed Oct. 16, 2024, (6 Pages).
Dosovitskiy et al., "An Image is Worth 16x16 Words: Transformers
for Image Recognition at Scale", ICLR 2021, Jun. 3, 2021 (22
pages).
Vaswani et al., "Attention is All You Need", 31st Conference on
Neural Information Processing Systems, NIPS 2017, Aug. 2, 2023
(15 pages).

* cited by examiner

COMPUTER-IMPLEMENTED METHOD AND SYSTEM FOR PLANNING THE BEHAVIOR OF A PARTICIPANT IN A TRAFFIC SCENE

This application claims priority under 35 U.S.C. § 119 to patent application no. DE 10 2023 205 056.0, filed on May 31, 2023 in Germany, the disclosure of which is incorporated herein by reference in its entirety.

BACKGROUND

The disclosure relates to a computer-implemented method for planning the behavior of at least one participant in a traffic scene, in which at least one grid-based scene representation is first generated on the basis of aggregated scene-specific information. The grid-based scene representation is divided into multiple tiles, each representing a partial area of the traffic scene. Based on these tiles, the grid-based scene representation is then mapped to latent features, whereby semantic relationships between the tiles are taken into account. The latent features thus generated are used as input for at least one downstream deep learning (DL) module for predicting the development of the traffic scene and/or for behavior planning.

The disclosure also relates to a computer-implemented system for planning the behavior of at least one participant in a traffic scene. The system comprises a perception module for generating a grid-based scene representation based on aggregated scene-specific information and a pre-processing component for splitting the grid-based scene representation into multiple tiles, each representing a partial area of the traffic scene. The system further comprises a DL architecture for mapping the grid-based scene representation to latent features using the tiles and taking into account semantic relationships between the individual tiles of the grid-based scene representation. The system also comprises at least one downstream DL module for predicting the development of the traffic scene and/or for behavior planning based on these latent features.

To enable high-performance and safe automated driving, automated vehicles must be able to anticipate the future development of a driving situation and act accordingly. Classic model-based approaches are reaching their limits in this context, especially in various urban scenarios, so DL-based methods for prediction and behavior planning are becoming increasingly established.

In this context, the method in question is based on a grid-based representation of the current traffic scene. For this purpose, scene-specific information is aggregated from different information sources of an ego vehicle and optionally also from non-vehicle information sources. As a rule, the scene-specific information is data recorded by camera, lidar and/or radar sensors. In addition, scene-specific information can also be recorded using road users' inertial sensors. The scene-specific information is often supplemented by GPS data and environmental information, e.g. weather data and road condition data. The scene-specific information is aggregated at a given timepoint and accordingly comprises the current sensor and other data at that timepoint. However, the information can also comprise sensor data and other data collected over a specified time period until the given timepoint. The scene-specific information can be transferred into a grid tensor using map information, for example in the form of a high-precision map, which then functions as a grid-based scene representation around the ego-vehicle. Such a grid tensor can comprise raw sensor data, for example lidar and/or radar sensor data, or also pre-processed sensor data, for example in the form of tracks for the respective participants in the traffic scene. The individual meshes of such a grid-based scene representation each correspond to a partial area of the traffic scene. They are hereinafter referred to as tiles or "patches". At this point, it should be noted that the individual tiles of a scene representation can represent partial areas of different sizes and/or shapes. Accordingly, the tiles do not necessarily have to be arranged in a uniform grid. A certain degree of overlap between the individual tiles of the scene representation would also be conceivable. In this case, position encoding could, e.g., be omitted because it is possible to derive directly from each tile which tiles it is adjacent to. In addition, objects or structures that lie exactly on the border of a tile could possibly be better recognized/considered.

The following are some examples of grid-based scene representations as they are known in practice:

RGB grids in which different semantic information, e.g. lane markings, vehicles, pedestrians, etc., are displayed in different color values, binary grids that comprise a binary layer in the grid tensor for each semantic information, whose value is 1 in places where the information exists and which otherwise has the value 0.

voxel grids, in which lidar point clouds are displayed, and voxel-flow grids in which radar reflexes are displayed.

It is also known to further process grid tensors using what is referred to as a backbone network in order to generate latent characteristics or features as input for downstream DL planning and prediction modules. Convolutive neural networks (CNNs), which are known from image processing, have been established for this purpose.

However, a new paradigm has developed in image processing-so-called vision transformers. Vision transformers are an extension of the classic transformers known from natural language processing. Such vision transformers are described, for example, in Dosovitskiy et al, "An Image is Worth 16×16 Words: Transformers for Image Recognition at Scale", and in Vaswani et al., "Attention is all you need."

A major disadvantage of CNNs is that the individual tiles are treated independently of the respective image content. The individual CNN filters glide evenly across the image so that relationships between neighboring pixels are primarily taken into account. The CNN's "perceptive field" is rather localized here. Relationships between more distant areas of an image can be taken into account to a certain extent by subsampling between the different layers of the CNN. However, this information is "soft-washed" by the multiple layers of CNN.

Vision transformers address this disadvantage of CNNs using the attention of a transformer. Using a vision transformer, the "perceptive field" therefore extends globally across the entire image because the attention to all tiles is taken into account. Attention takes the locality of perception into account by modeling semantic relationships between the image content of the individual tiles. For this purpose, the individual tiles are embedded using a neural network. These embeddings are then fed to a transformer. In the transformer, the tiles or embeddings are interpreted as what are referred to as tokens in order to model the relationships between the tiles in the form of attention. In this way, the information from the top left-hand corner of an image can, e.g., be elegantly combined with the information from the bottom right-hand corner of the image and placed in a meaningful context for the respective image processing task.

SUMMARY

The disclosure addresses this aspect of a vision transformer to specifically map information relevant to prediction and behavior planning in a given traffic scene and distributed across multiple tiles of a grid-based scene representation to latent features. This relevant information is thus made available to a downstream DL module, where it can be used for prediction and planning tasks. Known vision transformers only ever consider the information content of the individual tiles in its entirety in order to model relationships between the individual tiles. According to the disclosure, it has been recognized that, as a result, relevant information about the traffic scene is "diluted" and therefore probably not sufficiently mapped to the latent features accordingly. Therefore, the disclosure proposes a semantically differentiated use of the information content of the individual tiles. In this way, various semantic relationships between the image content of the individual tiles can also be extracted and mapped to the latent features.

According to the disclosure, this is achieved by distributing the scene-specific information over at least two semantic levels of the scene representation and maintaining this distribution when dividing the scene into tiles. At least one type of sub-tile is formed on the basis of the tiles and semantic levels, whereby the sub-tiles of a type are each formed by a subset of the at least two semantic levels of a tile defining the type. When mapping the grid-based scene representation to the latent features, semantic relationships between the sub-tiles of at least one type are then taken into account.

Accordingly, the core idea of the disclosure is to distribute the aggregated scene-specific information to different semantic layers of the grid-based scene representation and to subdivide each tile according to the semantics of the layers. The sub-tiles thus defined in can comprise just one or multiple semantic levels, depending on the type. According to the disclosure, relationships within one or multiple semantic levels can be modeled in a targeted manner, while the information of other semantic levels is disregarded. In this way, specific information can be extracted from the scene representation that is relevant for the prediction task and/or planning task. In addition, the measures according to the disclosure help to ensure that this "relevant" information is also reflected in the latent features. For example, the semantic relationships between the tiles at the level of infrastructure and road topology should be given special consideration for anticipatory driving, even at the edge of the field of vision. In contrast, for reactive driving, greater attention should be paid to other road users and in particular the road users immediately ahead. The semantic relationships between the sub-tiles of the infrastructure level will therefore generally differ from the semantic relationships at the road user level, but should be reflected in the latent features of the scene representation in each case.

At this point, it should be noted that when mapping the grid-based scene representation to the latent features, not only semantic relationships between sub-tiles of the same type can be taken into account, but also semantic relationships between sub-tiles of different types. This proves to be advantageous for, e.g., dynamic objects. In this case, interactions between the objects can be modeled using a first type of sub-tile, whereas a second type of sub-tile models the infrastructure, thus providing restrictions on the movement possibilities of the objects, such as "the vehicles must stay on the roadway".

It is essential for the application of the measures according to the disclosure that a grid-based scene representation is generated on the basis of aggregated scene-specific information. This can comprise raw sensor data, such as lidar and/or radar data. Alternatively or additionally, a grid-based scene representation could also comprise the results of a semantic evaluation of scene-specific raw sensor data, such as the evaluation results of a perception module in the form of object information in conjunction with position, orientation and movement data, map information, etc.

It is further essential to the disclosure that the aggregated scene-specific information is distributed to at least two different semantic levels of the scene representation. With regard to the intended prediction and planning task, it is advantageous if at least a first semantic level of the scene representation comprises position and/or movement information of one or multiple participants in the traffic scene. At least a second semantic level of the scene representation could then comprise information about static objects and/or infrastructure elements in the traffic scene. Within the scope of the disclosure, however, the scene-specific information can also be divided up in other ways. For example, a separate semantic layer could be provided for each participant or all participants of a type, i.e. four-wheeled vehicles, two-wheelers, pedestrians, or a separate semantic layer could be provided only for the ego-vehicle, while the information of the other participants of the traffic scene is summarized in a common semantic layer.

In a preferred embodiment of the disclosure, the grid-based scene representation is represented in the form of a three-dimensional scene tensor, whereby the first two dimensions of the scene tensor represent the spatial area of the traffic scene and the individual layers of the scene tensor in the third dimension are formed by the at least two semantic layers of the scene representation. In this case, the division into tiles and sub-tiles is particularly simple. For the division into tiles, only the first dimension and/or the second dimension of the scene tensor must be divided, while the third dimension of the scene tensor is retained. The resulting partial scene tensors each represent a partial area of the traffic scene and comprise all semantic levels of the scene tensor. Sub-tiles are then simply formed by one or multiple semantic levels of the sub-scene tensors.

An advantageous further development of the method according to the disclosure also takes into account the causality in the temporal development of a traffic scene by taking into account at least one further grid-based scene representation for at least one earlier timepoint when generating the latent features for the grid-based scene representations, in particular taking into account the temporal sequence of these grid-based scene representations. To ensure causality, so-called "attention masking" can be introduced here. Masking can, e.g., be used that permits tiles from timepoints t and t−1 to pay attention to tiles from timepoint t−2, but not vice versa.

For mapping the grid-based scene representation to the latent features, a DL architecture is preferably used in the method according to the disclosure, which generates embeddings for the sub-tiles in a first step, usually using positional encoding that reflects the position of the respective sub-tile within the scene representation. In a second step, this DL architecture then generates the latent features on the basis of the embeddings thus generated. This could be an attention-based DL architecture, such as a visual transformer, which determines the attention using key, query, or value vectors. However, it would also be conceivable to use a DL architecture that uses a different, predefined measure for the relationships between the tiles and sub-tiles of the scene representation, for example as a sum or element-wise product.

Further disclosed is a computer-implemented system for planning the behavior of at least one participant in a traffic scene, which is designed to implement the measures according to the disclosure. Such a system comprises a perception module for generating a grid-based scene representation based on aggregated scene-specific information, a pre-processing component for splitting the grid-based scene representation into multiple tiles, each representing a partial area of the traffic scene, a DL architecture for mapping the grid-based scene representation to latent features using the tiles and taking into account semantic relationships between the individual tiles of the grid-based scene representation, and at least one downstream DL module for predicting the development of the traffic scene and/or for behavior planning on the basis of these latent features.

According to the disclosure, the perceptual module is designed to distribute the scene-specific information to at least two semantic levels of the grid-based scene representation. Furthermore, the pre-processing component is designed to maintain the distribution of the scene-specific information over the at least two semantic levels when dividing into tiles and to form at least one type of sub-tiles, whereby the sub-tiles of a type each comprise a type-defining subset of the at least two semantic levels of a tile. Finally, the DL architecture is designed to take into account semantic relationships between the sub-tiles of at least one type when mapping the grid-based scene representation to the latent features.

In a preferred embodiment of the disclosure, the DL architecture for mapping the grid-based scene representation to latent features comprises at least one neural embedding network for generating embeddings for the sub-tiles of a type and at least one processing network for generating the latent features based on the thus generated embeddings. It is particularly advantageous if the DL architecture comprises multiple neural embedding networks for generating embeddings for sub-tiles of different types. In this case, the processing network should be designed to take into account embeddings of sub-tiles of different types when generating the latent features. In this way, various semantic relationships between the tiles and sub-tiles of the scene representation can be specifically recognized or extracted and taken into account when mapping to the latent features.

If the processing network is designed to take into account at least one further grid-based scene representation for at least one earlier timepoint when generating the latent features for the grid-based scene representation and, in particular, the temporal sequence of these grid-based scene representations, a certain causality in the temporal development of the traffic scene can also be taken into account.

BRIEF DESCRIPTION OF THE DRAWINGS

The measures according to the disclosure and preferred implementation options are explained in more detail hereinafter with reference to the drawings.

DETAILED DESCRIPTION

Figure 1:
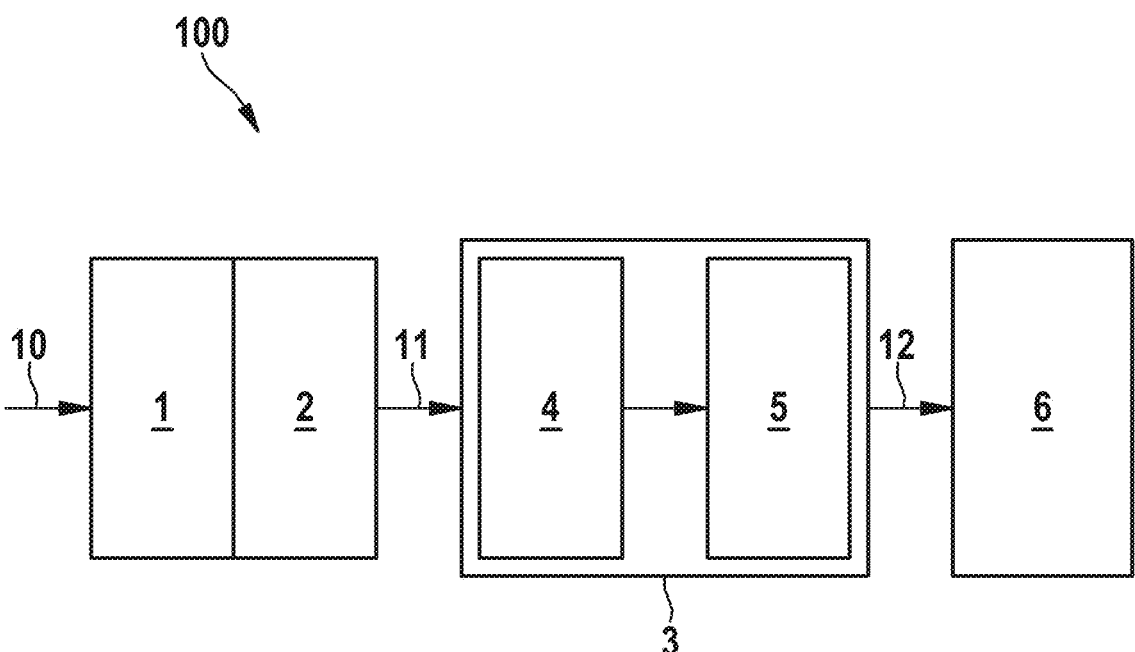
FIG. 1 illustrates the mode of operation of a computer-implemented system according to the disclosure for planning the behavior of a participant in a traffic scene by means of a block diagram.

The block diagram in FIG. 1 shows a computer-implemented system 100 for planning the behavior of an at least partially automated vehicle, which is also referred to hereinafter as an ego vehicle. The system 100 comprises a perception module 1 for generating a grid-based representation of the traffic scene. For this purpose, the perception module 1 aggregates scene-specific information 10 from various information sources within the vehicle and optionally from sources outside the vehicle. In most cases, the scene-specific information 10 is data recorded by camera, lidar and/or radar sensors. In addition, scene-specific information 10 can also be recorded using inertial sensors of the ego vehicle. The scene-specific information 10 is often supplemented by GPS data as well as map information, weather data and road condition data, which can be made available via a cloud, for example. The scene-specific information 10 aggregated at a given timepoint generally comprises the sensor data and other data that are current at this timepoint. However, the information can also comprise sensor data and other data collected over a specified time period until the given timepoint.

Figure 2:
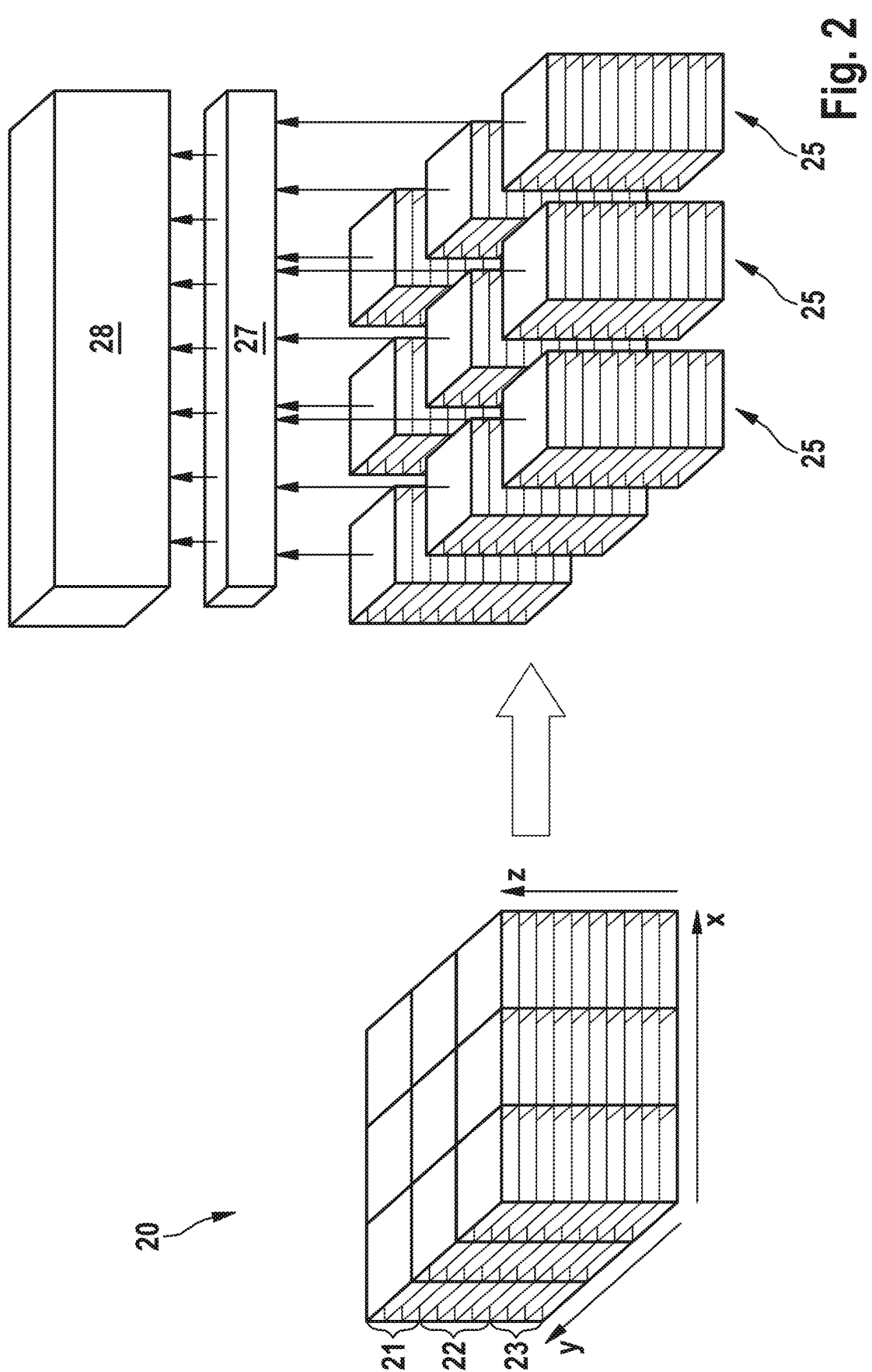
FIG. 2 illustrates a method for generating latent features based on a grid-based scene representation using a vision transformer.
Figure 3:
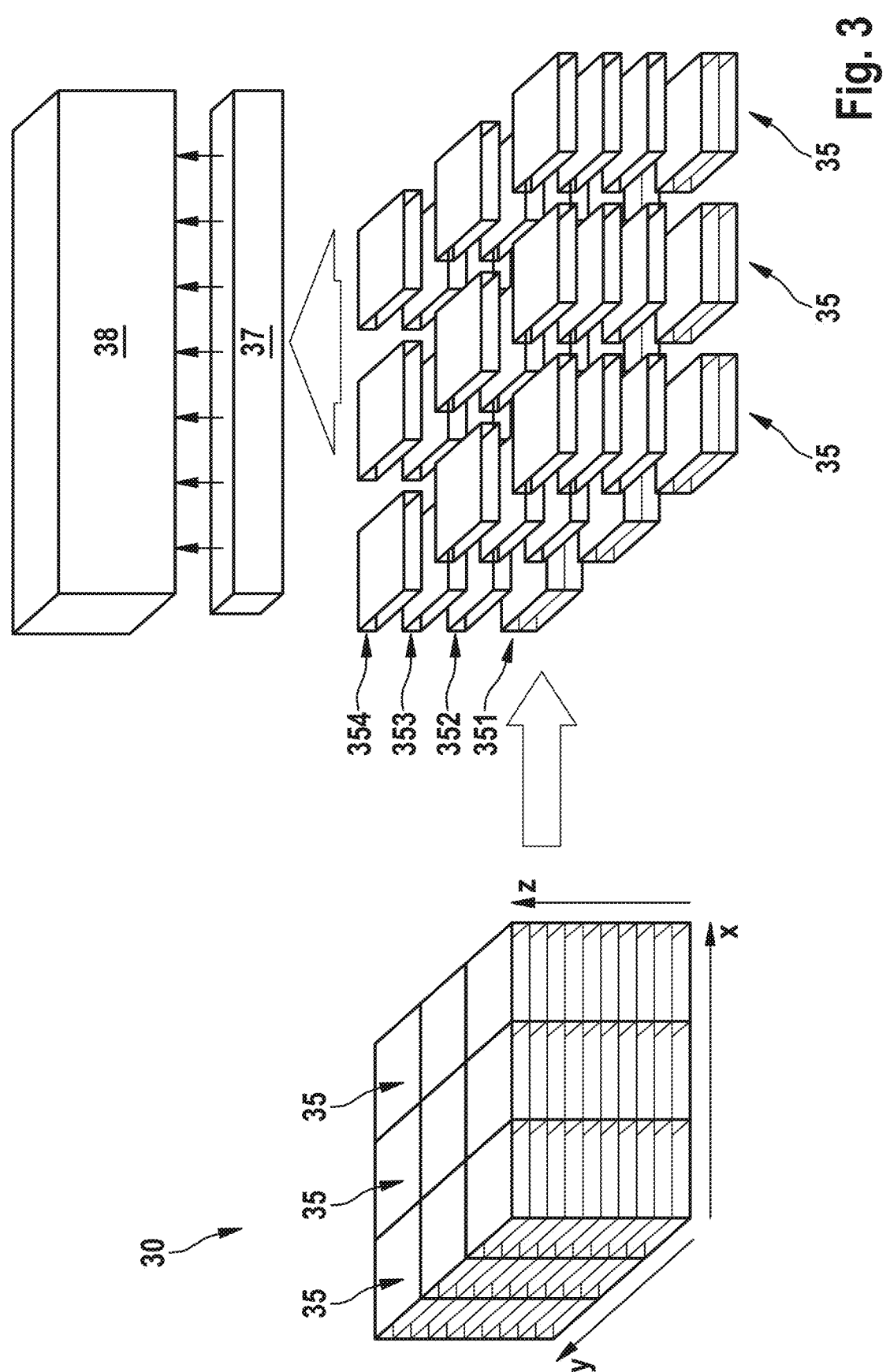
FIG. 3 uses the same type of representation as FIG. 1 to illustrate the measures according to the disclosure, and in particular to show the differences from the method illustrated by FIG. 2.

The perception module 1 can evaluate the aggregated scene-specific information 10, for example to recognize and locate objects and participants in the current traffic scene. As part of the evaluation, the aggregated scene-specific information 10 is converted into a grid-based scene representation using map information, such as a scene tensor 20 or 30, as shown in FIGS. 2 and 3. The scene-specific information 10 is distributed over at least two semantic levels of the grid-based scene representation.

Furthermore, the system 100 according to the disclosure comprises a pre-processing component 2 for dividing the grid-based scene representation into a plurality of tiles, each representing a partial area of the traffic scene. The distribution of scene-specific information across at least two semantic levels is retained when dividing into tiles. A further function of the pre-processing component 2 is to form at least one type of sub-tiles 11, whereby the sub-tiles 11 of a type each comprise a type-defining subset of the at least two semantic levels of a tile. The sub-tiles of a first type could thus comprise only one particular semantic level, whereas the sub-tiles of a second type are formed by only one other semantic level. Another type of sub-tile could comprise multiple semantic levels.

The functions of the pre-processing component 2 can be implemented completely or only partially in the perception module 1. However, the pre-processing component 2 can also be an independent component of the system 100.

The system 100 further comprises a DL architecture 3 for mapping the grid-based scene representation to latent features 12 for at least one downstream DL module 6 for predicting the evolution of the traffic scene and/or for behavior planning. The sub-tiles 11 are used as input data for the DL architecture 3. The latter is configured and trained such that the semantic relationships between the individual tiles or between the sub-tiles of at least one type are reflected in the generated latent features 12. For this purpose, the DL architecture 3 comprises at least one neural embedding network 4 for the respective type of sub-tile 11 in order to generate embeddings for the sub-tiles 11, and at least one processing network 5 for generating the latent features 12 on the basis of the embeddings thus generated.

The left half of FIG. 2 shows a grid-based scene representation of a traffic scene in the form of a three-dimensional scene tensor 20, which—as described hereinabove in connection with FIG. 1—has been generated by a perception module on the basis of scene-specific information. When transferring the aggregated scene-specific information into the three-dimensional scene tensor 20, map information was used so that the first two dimensions x and y of the scene tensor 20 represent the spatial area of the traffic scene. In addition, the scene-specific information was distributed across multiple semantic levels, in this case a total of ten semantic levels. These semantic levels form the individual layers of the scene tensor 20 in the third dimension z. The ten semantic levels were summarized in three groups: 21, 22, and 23. The first group 21 comprises three semantic levels with information on road topology, infrastructure and navigation, the second group 22 comprises four semantic levels with information on other participants in the traffic scene and the third group 23 comprises three semantic levels with information on the ego-vehicle.

In a further processing step, which is already indicated in the right half of FIG. 2 and is completed in the illustration in the left half of FIG. 2, the grid-based scene representation is divided into multiple tiles, each of which represents a partial area of the traffic scene. The distribution of scene-specific information across the different semantic levels of the scene representation is retained. In the exemplary embodiment shown here, the scene tensor 20 is divided into nine uniform tiles or partial scene tensors 25 by dividing the first dimension x and the second dimension y of the scene tensor 20 into three equal parts, while retaining the individual levels in the third dimension z of the scene tensor 20. Accordingly, each of the partial scene tensors 25 represents a partial area of the traffic scene with all semantic levels of the scene tensor 20.

The method shown in FIG. 2 provides for the generation of an embedding for each tile, i.e. for each of the nine partial scene tensors 25, using an appropriately trained embedding mesh 27. For this purpose, all semantic levels of a partial scene tensor 25 are fed to the embedding network 27. The embedding for a partial scene tensor 25 is therefore generated on the basis of all of its scene-specific information, which is all treated equally. All of the nine embeddings thus generated form the input data for a processing network 28, which then generates latent features for a downstream DL-based prediction and/or planning module on the basis of the entirety of the embeddings.

In contrast to the method described hereinabove in connection with FIG. 2, the scene-specific information of a tile is not all treated equally when generating latent features within the scope of the method according to the disclosure, but is considered in a semantically differentiated manner. This is explained in more detail hereinafter in conjunction with FIG. 3.

Similar to FIG. 2, a scene tensor 30 is shown in the right half of FIG. 3, which also comprises a total of ten semantic levels. A division into nine uniform tiles or partial scene tensors 35 is already indicated here. The individual tiles 35 are additionally subdivided into sub-tiles 351, 352, 353, 354. According to the disclosure, this subdivision is made from a semantic point of view. The various layers of a binary scene tensor are grouped according to their semantics. If the scene tensor is an RGB grid tensor, then a subdivision by color is recommended. In addition, a grouping according to time could also be made if earlier scene representations are also taken into account when processing a scene representation for a given timepoint. The division into sub-tiles 351, 352, 353, 354 is shown in the left half of FIG. 3. The sub-tiles 351 comprise multiple semantic layers, all of which mainly contain information about static components of the traffic scene, such as infrastructure and road topology, etc. On the other hand, the semantic levels having information about the participants or objects in the traffic scene are additionally grouped according to their timepoint. Three types of sub-tiles are provided in this case, each having information about the ego vehicle and the other road users: sub-tiles 352 for the current timepoint, sub-tiles 353 for the previous timepoint and sub-tiles 354 for the timepoint before that.

It is essential to the disclosure that at least one type of sub-tile is formed on the basis of the tiles and semantic levels and optionally the timepoint. The sub-tiles are therefore formed by a subset of the semantic levels of the scene representation, in which case the respective subset determines the type of sub-tiles.

According to the disclosure, an embedding is generated for each sub-tile 351, 352, 353 and 354, i.e. using appropriately trained embedding meshes 37. Since a separate appropriately trained embedding network 37 is used for each sub-tile of a different type, a semantically differentiated processing of the scene-specific information of a tile is already performed during embedding. In this exemplary embodiment, four times nine sub-tiles are considered, and four times nine embeddings are generated accordingly. These form the input data for a processing network 38, which then generates latent features for a downstream DL-based prediction and/or planning module on the basis of the entirety of the embeddings. In this way, the semantic relationships between the sub-tiles of at least one type are taken into account when mapping the grid-based scene representation to the latent features. Very fine attention can, e.g., be paid to various segments of the street. Since the embedding of the sub-tiles of different types is performed using differently trained embedding networks, the method according to the disclosure is able to exploit the semantics of the scene representation to a greater extent than the method shown in FIG. 2, which processes all scene-specific information of the individual tiles equally and does not perform any semantic differentiation.

What is claimed is:

1. A computer-implemented method for planning a behavior of at least one participant in a traffic scene, comprising:
    generating at least one grid-based scene representation based on aggregated scene-specific information;
    dividing the at least one grid-based scene representation into multiple tiles, each tile representing a partial area of the traffic scene;
    mapping the at least one grid-based scene representation to latent features based on the tiles, wherein semantic relationships between the tiles are taken into account; and
    using the latent features thus generated in as input for at least one downstream deep learning module for predicting a development of the traffic scene and/or for behavior planning,
    wherein the aggregated scene-specific information is distributed over at least two semantic levels of the at least one grid-based scene representation, and the distribution is maintained during the division into tiles,
    wherein at least one type of sub-tile is formed based on the tiles and the at least two semantic levels,
    wherein the sub-tiles of a type are formed in each case by a subset defining the type of the at least two semantic levels of the tile, and
    wherein semantic relationships between the sub-tiles of at least one type are taken into account when mapping the grid-based scene representation to the latent features.

2. The method according to claim 1, wherein the semantic relationships between sub-tiles of the same type and/or between sub-tiles of different types are taken into account when mapping the at least one grid-based scene representation to the latent features.

3. The method according to claim 1, wherein the at least one grid-based scene representation comprises scene-specific raw sensor data and/or results of a semantic evaluation of the scene-specific raw sensor data.

4. The method according to claim 1, wherein:

at least a first semantic level of the scene representation comprises position and/or movement information of at least one participant of the traffic scene, and at least a second semantic level of the scene representation comprises information about static objects and/or infrastructure elements in the traffic scene.

5. The method according to claim 1, wherein:

the at least one grid-based scene representation is represented as a three-dimensional scene tensor, a first dimension and a second dimension of the scene tensor represent a spatial area of the traffic scene, and individual layers of the scene tensor in a third dimension are formed by the at least two semantic layers of the scene representation.

6. The method according to claim 5, wherein the at least one scene representation is split into the tiles by splitting the first dimension and/or the second dimension of the scene tensor, while the third dimension of the scene tensor is retained, so that resulting partial scene tensors each represent a partial area of the traffic scene with all semantic levels of the scene tensor.

7. The method according to claim 1, wherein:

when generating the latent features for the at least one grid-based scene representation, at least one further grid-based scene representation is taken into account for at least one earlier timepoint, and a temporal sequence of the at least one grid-based scene representation is taken into account.

8. The method according to claim 1, wherein:

a deep learning architecture is used for mapping the at least one grid-based scene representation onto the latent features, the deep learning architecture generates embeddings for the sub-tiles in a first step, and generates the latent features in a second step based on the generated embeddings.

9. A computer-implemented system for behavior planning of at least one participant in a traffic scene, comprising:

a perceptual module configured to generate a grid-based scene representation based on aggregated scene-specific information;

a pre-processing component configured to split the grid-based scene representation into multiple tiles, each tile representing a partial area of the traffic scene;

a deep learning architecture configured to map the grid-based scene representation to latent features using the tiles and taking into account semantic relationships between individual tiles of the grid-based scene representation; and at least one downstream deep learning module configured to predict a development of the traffic scene and/or to behavior plan based on the latent features, wherein the perceptual module is configured to distribute the scene-specific information to at least two semantic levels of the grid-based scene representation, wherein the pre-processing component is configured to maintain the distribution of the scene-specific information to the at least two semantic levels during the division into the tiles and to form at least one type of sub-tile, wherein the sub-tiles of a type each comprise a type-defining subset of the at least two semantic levels of a tile, and wherein the deep learning architecture is configured to take into account semantic relationships between the sub-tiles of at least one type when mapping the grid-based scene representation to the latent features.

10. The system according to claim 9, wherein the deep learning architecture for mapping the grid-based scene representation to latent features comprises:

at least one neural embedding network configured to generate embeddings for the sub-tiles of a type; and at least one processing network configured to generate the latent features based on the generated embeddings.

11. The system according to claim 10, wherein:

the deep learning architecture comprises a plurality of neural embedding networks configured to generate the embeddings for sub-tiles of different types, and the processing network is configured to take into account the embeddings of the sub-tiles of different types when generating the latent features.

12. The system according to claim 9, wherein the processing network is configured to take into account at least one further grid-based scene representation for at least one earlier timepoint when generating the latent features for the grid-based scene representation, and a temporal sequence of the grid-based scene representations.

* * * * *